United States Patent Office 2,857,426
Patented Oct. 21, 1958

2,857,426
PURIFICATION PROCESS FOR PETROLEUM SULFONATES

Le Roi E. Hutchings and Le Roy W. Holm, Crystal Lake, Ill., assignors to The Pure Oil Company, Chicago, Ill., a corporation of Ohio No Drawing. Application December 19, 1956
Serial No. 629,230

9 Claims. (Cl. 260—504)

This invention relates in general to a process for the purification of hydrocarbon sulfonates, resulting from the neutralization of hydrocarbon sulfonic acids prepared by the reaction of a sulfonatable material with a sulfonating agent, wherein the undesirable insolubles are separated in a particular manner and the purified product is characterized by its ability to pass the water suspectibility test.

This invention is an improvement over the processes described in two copending applications, namely application Serial Number 603,811, filed August 13, 1956, entitled, "A Purification Process," by L. E. Hutchings, and application Serial Number 612,950, filed October 1, 1956, entitled, "Preparation of Petroleum Sulfonates," by G. W. Crosby and L. E. Hutchings. In application Serial Number 603,811 there is described a process for preparing petroleum sulfonates which pass the water susceptibility test wherein the neutralized sulfonic acids are dissolved in a solvent miscible with the sulfonate phase and the mixture is filtered through a filter aid having sufficient retentive ability to retain the precipitated particles therein and the filtered product is separated from the solvent phase. In application Serial Number 612,950, the sulfonic acids are treated with certain single solvents prior to neutralization, or after the removal of any sulfur dioxide present or formed in the reaction, taking the mixture up in water and separating the resulting water phase from the oil-sulfonic acid-solvent phase. The solvents used in these applications are two classes, (1) halogenated hydrocarbons having more than one carbon atom and boiling lower than the initial boiling point of the neutralized sulfonate mixture, and (2) certain ketones and ethers.

This invention is based on the discovery that hydrocarbon sulfonates which pass the water susceptibility tests can be produced by centrifuging under conditions of high centrifugal force in the presence of a solvent selected from the classes of low-boiling hydrocarbons of either aliphatic, aromatic or naphthenic types and low-boiling halogenated hydrocarbons, including solvents which had proven to be ineffective in these previous applications. The invention is further based on the finding of certain sequential steps which fall into three general procedures, depending on the manner in which the neutralization of the sulfonic acids is accomplished. Thus, the invention depends on the relationship of the steps of neutralization, solvent treatment and centrifuging to each other and to the general process whereby highly purified metal sulfonates are prepared, characterized by their compatibility with mineral lubricating oils as evidenced by the water susceptibility tests.

Accordingly, it becomes a primary object of the invention to prepare hydrocarbon sulfonates which pass the water susceptibility tess or tests.

Another object of the invention is to provide a process for purifying hydrocarbon sulfonates of low base number which pass the water susceptibility tests.

Another object of the invention is to provide a process for purifying hydrocarbon sulfonates of high base number which pass the water susceptibility tests.

Still a further object is to provide a process for purifying hydrocarbon sulfonates of high base numbers prepared by the addition of a single base reactant which pass the water susceptibility tests.

A further object of the invention is to provide a process for purifying hydrocarbon sulfonates by employing the steps of neutralization, solvent addition and centrifuging in certain relations to each other and to the over-all process whereby sulfonate products are obtained which have high utility as detergents and are compatible with mineral lubricating oils.

The term hydrocarbon sulfonates as used herein is intended to cover all sulfonates formed by the reaction of a sulfonatable material with a sulfonating agent. By neutralization as used herein is intended to mean the addition of an amount of a reactable base or basic material in excess of that theoretically required to exactly neutralize the sulfonic acids present in the oleaginous reaction mixture. The extent or degree of said neutralization is measured by the base number of the finished sulfonate-oleaginous mixture.

The above objects and further objects of the invention will appear in part or in full as the description of the invention proceeds.

The prior art recognizes the problem of suspended or dissolved inorganic salts or impurities and low-molecular-weight sulfonic acids in a sulfonated mixture. It is known to apply a solvent extraction step followed by filtration for their removal, but filtration alone is known to be inadequate for this purpose. Treatment of the sulfonate mixture, after neutralization, with 3–10% sodium chloride solution in about 10–25% of alcohol or methyl ethyl ketone, separation of the oil phase therefrom and filtering the oil phase, followed by heat treatment to drive off the solvent, has been proposed to solve this problem. However, it has been found in accordance with this invention that this prior art sequence of steps does not produce a product which passes the water susceptibility tests.

Filtration in the presence of such solvents as hexane or benzene, after neutralization and washing, also is inadequate for the present purposes. Also, the practice of separating a water phase after the neutralization step, before filtering, results in a loss of neutralizing agent which, although it may in some instances produce a sulfonate that will pass the water susceptibility tests, is to be avoided. Other investigators have proposed the removal of sulfuric acid and low-molecular-weight sulfonic acids prior to neutralization. Methods which have been proposed to accomplish this have involved filtration or contacting of the crude sulfonic acids with various media prior to neutralization. However, these methods and/or processes are generally applied to cases in which a gross amount of impurities are present, and do not result in the production of products of satisfactory water susceptibility properties. Moreover, some of the methods practiced have resulted in large losses of oil-soluble sulfonates.

The process of this invention involves three general procedures which are, as before stated, dependent upon the degree of neutralization applied. These general procedures are described as follows:

I. *The production of sulfonates having low base numbers*

(1) Sulfonic acids are prepared by reaction of a sulfonatable material and a sulfonating agent in the presence of a mutual solvent such as sulfur dioxide or ethylene dichloride.

(2) The sulfur dioxide, if present, is removed (by stripping or distillation) and a solvent selected from the class hereinafter defined is added. Where ethylene dichloride is used as the solvent during the sulfonation reaction, it is usually retained as the solvent during the subsequent steps.

(3) An aqueous solution of a base is added in excess of stoichiometric requirements to neutralize the sulfonic acids, that is, up to about 120% of stoichiometric amounts.

(4) The resulting neutralized mixture is centrifuged at a centrifugal force greater than 4,000 gravities.

(5) The solvent and water are removed, as by evaporation, and the finished sulfonates are separated.

II. *Production of sulfonates having high base numbers*

(1) Steps 1–4 of procedure I are repeated.

(5) After centrifuging, the sulfonates are treated with an additional amount of base, said amount being up to an amount equal to the difference between 200% of that theoretically required to neutralize the sulfonic acids and the amount added in step 3.

(6) The solvent and water are removed, as by evaporation.

(7) The recovered sulfonates are treated with a filter aid of sufficient retentive ability to retain any precipitated particles present and the purified sulfonates are recovered.

III. *Production of sulfonates having high base numbers by the single addition of a base*

(1) Sulfonic acids are prepared by reaction of a sulfonatable material and a sulfonating agent in the presence of a mutual solvent such as sulfur dioxide or ethylene dichloride.

(2) The sulfur dioxide, if present, is removed (by stripping or distillation) and a solvent selected from the class hereinafter defined is added. Where ethylene dichloride is used as the solvent during the sulfonation reaction, it is usually retained as the solvent during the subsequent steps.

(3) An aqueous solution of a base is added in an amount up to about 200% of the amount required to neutralize the sulfonic acids.

(4) Heat the reaction mixture at an elevated temperature (150–200° F.) for at least several minutes to complete the reaction while at the same time removing the solvent and water.

(5) Add a solvent or mixture of solvents selected from the class hereinafter defined.

(6) The mixture is subjected to centrifuging at a centrifugal force greater than about 4,000 gravities.

(7) The solvent is removed, as by evaporation, to separate the finished sulfonates.

It is seen from the foregoing description that methods I and II differ only in that additional base is added after centrifuging, which if impure base is used, necessitates a final filtering step. Method III is the preferred procedure because of the processing economies that are achieved and the ease with which the steps are carried out. In addition to insuring that highly purified sulfonates are produced, the present invention has the advantage of allowing the use of a broader range of solvents for the purification. The invention is illustrated in detail by the following examples and discussion thereon.

EXAMPLE I

A mixture of ethylene dichloride and 200 vis., 85 V. I., finished neutral oil (2 volumes of ethylene dichloride per volume of oil) was sulfonated in an apparatus wherein about 5% w. (based on oil) of sulfur trioxide, dissolved in 10 volumes of ethylene dichloride per volume of sulfur trioxide, was sprayed into the flowing oil stream. The resulting sulfonic acids were "neutralized" at 160° F. by adding a water solution of barium hydroxide containing 1.2 times the amount of hydroxide theoretically required to neutralize the acids present. (The base had been dissolved in an amount of water equal to 10% of the volume of the acid mixture.) The resulting mixture was passed through a Sharples laboratory centrifuge, type T–1, operating at 23,000 R. P. M., at a rate of 200 cc./minute. A centrifugal force of about 13,200 times gravity was thus applied. A small amount of solids was separated by the centrifuging, and the resulting liquid phase was a fluid emulsion. After solvent and water had been removed by evaporation, the resulting sulfonate product passed both water susceptibility tests.

EXAMPLE II

Sulfonic acids were prepared, "neutralized," and centrifuged as in Example I, but after the water and solvent had been removed, a trace of solids remained in the sulfonate-oil mixture. These solids had resulted from incomplete utilization of the base during the "neutralization" step and the subsequent formation of barium carbonate during centrifuging. This solid material was removed by passing the mixture through filter aid and the resulting sulfonate-oil mixture passed both water susceptibility tests. Ordinarily the purification of sulfonates capable of passing the water susceptibility tests by filtration alone has necessitated the presence of solvents. However, it was found that the centrifuging step in this example was sufficient to prepare a satisfactory product with only a final filtration step without solvent.

EXAMPLE III

A portion of 200 vis., 85 V. I., finished neutral oil was mixed with ethylene dichloride in a ratio of one volume of solvent to one volume of oil, and the mixture was sulfonated at about 100° F. by the method of Example I. The sulfonic acids formed were then "neutralized" by the addition of barium hydroxide equal to 200% of the amount theoretically required to neutralize the acids. The hydroxide had previously been dissolved in an amount of distilled water equal to 10% of the volume of the acid-oil mixture. The resulting mixture, still containing the ethylene dichloride used as the solvent in the sulfonation reaction, was passed through a Sharples laboratory centrifuge, type T–1, as in Example 1, except that the rotational speed was only 13,000 R. P. M. at a rate of 200 cc./min. In this case the centrifugal force was only about 4,210 times the force of gravity. The effluent stream was a fluid emulsion. After the solvent and water had been removed by evaporation a small amount of solids was present in the sulfonate-oil mixture. These solids, which were predominantly barium carbonate formed by the reaction of unused base and carbon dioxide from the atmosphere, were removed by filtration through filter aid at about 300° F. The filtered sulfonate-oil mixture passed both water susceptibility tests.

This example, in addition to establishing the minimum effective centrifugal force, shows that while up to 200% of the amount of base theoretically required to neutralize the sulfonic acids may be added in one batch to the sulfonic acid-oil-solvent mixture, incomplete utilization of this base may result, and part of it may be lost necessitating a final "clean-up" filtering step.

EXAMPLE IV

A composite blend of finished barium petroleum sulfonates, 11.6% ash as $BaSO_4$, 23 base No., prepared in several experimental batches by sulfonating the oil of Example I, in the presence of at least one volume of liquid sulfur dioxide per volume of oil at the boiling point of sulfur dioxide, with sulfur trioxide dissolved in at least 5 volumes of liquid sulfur dioxide per volume of sulfurtrioxide, and in the preparation of which the sulfur dioxide had been removed by heating and stripping with nitrogen before neutralization, was diluted with two volumes of hexane per volume of sulfonate-oil mixture. The resulting mixture was centrifuged at a rate of 200 cc./minute, at 23,000 R. P. M. (13,200×gravity), in a Sharples laboratory centrifuge, type-T-1. The mixture entering the centrifuge was cloudy, but a clear effluent was obtained, and after the hexane had been removed by distillation, the sulfonate-oil product passed both water susceptibility tests.

EXAMPLE V

Sulfonic acids were prepared by treating 200 vis., finished neutral oil, dissolved in twice its volume of ethylene dichloride, with 6% w. of sulfur trioxide dissolved in five volumes of ethylene dichloride, at 25° F. A portion of these acids was neutralized and the solvent and water were removed by heating at 350° F. for one-half hour. Water and hexane were then added to the sulfonate-oil mixture, and the resulting mixture was filtered through filter aid. The filtered product, even though apparently clear, did not pass the water susceptibility tests. Thus, hexane is shown by Example IV to be a suitable solvent in the centrifuging process of this invention, but is not suitable when filtration is used.

EXAMPLE VI

Fifty cubic centimeters of finished barium petroleum sulfonate was prepared by the method described in Example I and the solvent and water were removed by distillation. The sulfonate-oil mixture was then diluted with 100 cc. of hexane and a cloudy solution resulted. One hundred cubic centimeters of this mixture were placed in a 100 cc., pear-shaped BS & W type centrifuge tube (see ASTM Method D96–46), and the mixture was centrifuged in an International Centrifuge for one minute at 2000 R. P. M. A maximum centrifugal force of 1120 gravities was attained. No appreciable clarification of the mixture took place, so the tube was replaced in the centrifuge and was centrifuged for 10 minutes at 2000 R. P. M. At the end of this time three "layers" had developed. The upper layer was a fairly clear solution, the middle layer, in the area of the graduations on the tube, was very cloudy, and the bottom layer, which had a volume of less than 0.2 cc., was solid. Since the two liquid layers would have remained together in a flow-type centrifuge, they were decanted from the solids and the solvent and water were removed by evaporation. The resulting product was cloudy and did not pass the water susceptibility tests. This example, which is similar to Example I, except that lower centrifugal force was applied, demonstrates the necessity for "super-centrifuging," i. e., centrifuging at high force levels.

EXAMPLE VII

Twenty cubic centimeters of a finished, basic, barium petroleum sulfonate, prepared by the method of Example I, were freed of solvent and water by evaporation. The sulfonate-oil mixture, which was cloudy, was diluted with 20 cc. of hexane, and 2 cc. of distilled water were added. After the mixture had been gently agitated and allowed to stand for a few minutes, a water-oil emulsion separated, but the sulfonate-oil-hexane phase remained cloudy. The mixture was further shaken for 60 seconds and allowed to stand. In ten minutes no separation had occurred, so an additional 20 cc. portion of normal hexane was added and the mixture was again agitated. A stable emulsion again resulted.

In an attempt to break the emulsion, a drop of 95% sulfuric acid was added, after which the pH of the mixture was 6, but the emulsion persisted. On standing for several hours, a water phase developed. This phase was heavy with barium sulfate which had formed by the reaction of the sulfuric acid with the basic and/or neutral sulfonates, but the hexane-containing phase remained cloudy. Filtration of this hexane-containing phase yielded a product which, after hexane had been removed by evaporation, was cloudy and did not pass the water susceptibility tests. Simple settling after the addition of solvent is therefore shown to be inadequate for the preparation of sulfonates which pass the water susceptibility tests.

The "water susceptibility tests" which were used as the criteria for evaluating the end-product of this invention are known. While such tests do not normally appear in specifications for lubricating oils or lubricating oil additives, they are useful and significant in that they give an indication of the performance of finished oils containing the sulfonates with respect to potential emulsion formation with water, and also give an indication of the stability of the sulfonate-containing additive when in storage under adverse conditions, that is, for example, in wet tanks.

The water susceptibility test referred to in the specification as a "blend test" is a measure of the performance to be expected of the sulfonate when incorporated in a crankcase oil, and is conducted in the following manner: A finished blend of the oil and additive or additives, in proportions normally used in crankcase oil formulations, is first prepared and agitated for ½ hour at room temperature with 0.1% by weight of water present. The mixture is then observed for cloudiness and precipitation and allowed to stand. Additional observations of the amount of haze and/or insoluble materials present are made at the end of 24 and 48 hours' standing. If the water separates quickly from the blend and leaves a clear solution, and if there is no precipitate formation, the blend is considered to have passed the test.

The second water susceptibility test is referred to as the "concentrate test." In this test, 4 parts by volume of a base oil, and 1 part by volume of the additive are blended together, and this concentrate is agitated for ½ hour in the presence of 1.0% by weight of water. After observation for haze and precipitates, it is placed in a constant temperature bath at 250° F. where it is agitated with nitrogen stripping for 2 hours to remove the added water. Again an observation is made and the test sample is allowed to stand. After 24 hours another observation is made and the amount of precipitate is noted and recorded. The blend should be completely reconstituted, that is, there should be no precipitates and a clear, stable solution should be attained, following this process. In a number of experiments not reported herein it was found that various samples of commercially produced barium sulfonates did not pass the "blend test." Furthermore, various samples of barium sulfonates prepared from petroleum sulfonic acids and distributed as lubricating oil additives were found to fail both the blend test and the concentrate test. Barium petroleum sulfonates prepared and purified in accordance with this invention, even though allowed to stand for long periods of time or subjected to extended adverse storage conditions, were found to pass both the blend and concentrate water susceptibility tests. Where the term "water susceptibility test" is used in this specification, reference is made to either or both of the concentrate and blend tests.

The improved purification process of my invention may be applied to hydrocarbon oil-sulfonating-agent reaction mixtures using an oil containing at least 10% to 40% of sulfonatable material and capable of producing oil-soluble sulfonates as described in the prior art. The sulfonating agent may be sulfur trioxide, either liquid or gaseous and preferably modified by dilution with an inert carrier, sulfuric acid, or sulfuric acid-sulfur trioxide mixtures. The reaction product to be purified may result from the reaction of a hydrocarbon oil and a sulfonating agent under a broad range of conditions. The temperature of the sulfonation reaction may vary from −30° F. to 100° F. or higher. In using liquid sulfur trioxide dissolved in an inert carrier as the sulfonating agent, the optimum reaction conditions are about 10° to 50° F., under which conditions a minimum amount of insoluble impurities are obtained. Various petroleum oil fractions may be used as the feed oil for the process including lubricating oil fractions, both refined and unrefined. Refined neutral lubricating oils and bright stocks are good starting materials. The reaction may be carried out on a batch or continuous scale.

The metal base used in the neutralization step may be any hydroxide or oxide of a group II metal such as calcium, strontium, or barium. Other metal salts such as carbonates, acetates and chlorides of magnesium, cadmium, or other metals, may be used with approximate changes in neutralization conditions as are known in the art.

The solvent used may be selected from the group consisting of low-boiling hydrocarbons of aliphatic, aromatic or naphthenic configuration and low-boiling halogenated hydrocarbons. Examples of suitable solvents include the following:

Aliphatic hydrocarbons:
 Pentane
 Hexane
 Heptane
 Octane
 Nonane
 Decane
 Undecane
 Dodecane
 Tridecane
 Tetradecane
 Pentadecane Aromatic hydrocarbons:
 Benzene
 Toluene
 o-Xylene
 m-Xylene
 p-Xylene
 Ethyl benzene
 Trimethyl benzene (mesitylene)
 n-Propyl benzene
 Isopropyl benzene
 Cymene
 Durene Naphthenic hydrocarbons:
 Naphthalene
 1-methyl naphthalene
 2-methyl naphthalene
 3-ethyl naphthalene Halogenated hydrocarbons:
 Ethylene chloride
 Ethylene bromide
 Ethyl chloride (bromide or iodide)
 n-Propyl chloride (bromide or iodide)
 Isopropyl chloride (bromide or iodide)
 n-Butyl chloride (bromide or iodide)
 Sec-butyl bromide (chloride or iodide)
 Isobutyl chloride (bromide or iodide)
 Tert-butyl chloride (bromide or iodide)
 n-Amyl chloride (bromide or iodide)
 Tert-amyl chloride (bromide or iodide)
 Neopentyl chloride (bromide or iodide)
 n-Hexyl fluoride (bromide or iodide)
 n-Heptyl fluoride (chloride or iodide)
 n-Octyl chloride
 Ethylidene halides The solvent used must be unreacted with the sulfonate reaction mixture, miscible with the oil phase, insoluble in the water phase and have a boiling point below that of the sulfonate mixture. Of the solvents mentioned heretofore, the following are preferred: pentane, hexane, heptane, benzene, toluene, the xylenes, naphthalene, and ethylene chloride. The primary alkyl halides are preferred because of their chemical and thermal stability. Tertiary halides containing more than 6-carbon atoms are unstable and therefore unsuitable.

The neutralization with the metal base is completed by maintaining the mixture at an elevated temperature but below the boiling point of the solvent. Broadly, the temperature may vary from about 170° to 350° F., but where ethylene chloride is the solvent the highest temperature is about 200° F. Pressure may be used to permit higher neutralization temperatures, if desired. Although, according to the experiments so far performed, there does not appear to be any relationship between the base number of the neutralized product and its ability to pass the water susceptibility test, there is a connection between the clarity of the product and the passage of the test. A cloudy product will not pass the water susceptibility test. With regard to the base number, it was found that at very low base numbers of the neutralized products there is a tendency for the product to filter slowly. Accordingly, the amount of the base used must be in excess of the stoichiometric requirements to neutralize the product and must be less than 200% of that theoretically required for neutralization. This requirement is necessary in order that the excess base be totally assimilated into the solvent-sulfonate mixture either by reaction, dissolution, or both. It is contemplated that the process of the invention can be applied in restoring a cloudy product, or one which did not pass the water susceptibility test, into a clear product that passes the test. This is accomplished by taking up the cloudy product in a suitable solvent, making sure an excessive amount of base is present, and processing in accordance with the invention.

What is claimed is:

1. The method of manufacturing polyvalent metal petroleum oil sulfonates which comprises reacting a refined lubricating oil with a sulfonating agent selected from the group consisting of sulfur trioxide, sulfuric acid and sulfuric acid-sulfur trioxide mixtures in the presence of a solvent selected from the group consisting of sulfur dioxide and ethylene chloride, recovering the resultant sulfonic acids from the reaction mixture, reacting said recovered sulfonic acids with an aqueous solution of a polyvalent base selected from the group consisting of calcium, strontium, and barium bases and their mixtures, said aqueous solution containing up to about 120% of the stoichiometric amount of said base necessary to neutralize said sulfonic acids, mixing the neutralized product with a liquid solvent selected from the group consisting of aliphatic hydrocarbons, halogenated hydrocarbons and aromatic hydrocarbons, said solvent being miscible with the sulfonate phase of said neutralized product and having a boiling point lower than the boiling point of the neutralized product and subjecting the solvent solution to centrifuging at a centrifugal force of between about 4000 to 15000 gravities and recovering purified polyvalent metal, petroleum oil sulfonates which are characterized by their ability to pass the water susceptibility tests.

2. The method in accordance with claim 1 in which said refined lubricating oil is a solvent refined neutral oil.

3. The method in accordance with claim 1 in which said metal base is a calcium base.

4. The method in accordance with claim 1 in which said metal base is a strontium base.

5. The method in accordance with claim 1 in which said metal base is a barium base.

6. The method in accordance with claim 1 in which the liquid solvent present during said centrifuging is aliphatic hydrocarbon.

7. The method in accordance with claim 1 in which said liquid solvent present during said centrifuging is a halogenated hydrocarbon.

8. The method in accordance with claim 1 in which said liquid solvent present during said centrifuging is an aromatic hydrocarbon.

9. The process in accordance with claim 1 in which the product after centrifuging is treated with an additional amount of said polyvalent metal base equal to the difference between 200% of the stoichiometric amount required for neutralization and the amount present, the neutralized product is heated to remove the solvent and water and the recovered sulfonates are filtered and the purified sulfonates recovered from the filtrate.

References Cited in the file of this patent

FOREIGN PATENTS 735,221    Great Britain ---------- Aug. 17, 1955

OTHER REFERENCES

Brown: Institute of Petroleum Review, vol. 9, pp. 314–321 (8 pp.), 1955.